United States Patent [19]

Taylor

[11] Patent Number: 4,683,809

[45] Date of Patent: Aug. 4, 1987

[54] LIGHTWEIGHT PISTON

[75] Inventor: Allan H. Taylor, Newport News, Va.

[73] Assignee: The United States of America as represented by the Administrator of the National Aeronautics and Space Administration, Washington, D.C.

[21] Appl. No.: 729,767

[22] Filed: May 2, 1985

[51] Int. Cl.⁴ .............................................. F16J 1/04
[52] U.S. Cl. ............................... 92/208; 29/156.5 R
[58] Field of Search ............... 92/222, 223, 225, 228, 92/208, 212, 213; 123/193 P; 29/156.5 R

[56] References Cited

U.S. PATENT DOCUMENTS

| 4,242,948 | 1/1981 | Stang et al. | |
|---|---|---|---|
| 4,245,611 | 1/1981 | Mitchell et al. | |
| 4,274,372 | 6/1981 | Kelm et al. | |
| 4,341,826 | 7/1982 | Prewo et al. | |
| 4,354,804 | 10/1982 | Cruzen | 416/230 |
| 4,363,602 | 12/1982 | Martin | 416/230 R |
| 4,404,935 | 9/1983 | Kraft | |
| 4,465,434 | 8/1984 | Rourk | 416/230 |
| 4,466,399 | 8/1984 | Hinz et al. | 92/144 X |

FOREIGN PATENT DOCUMENTS 2090645  7/1982  United Kingdom ............... 417/363

Primary Examiner—Edward K. Look
Attorney, Agent, or Firm—George F. Helfrich; John R. Manning

[57] ABSTRACT

A lightweight piston 12 composed of carbon-carbon is disclosed. The use of carbon-carbon over conventional materials, such as aluminum, reduces piston weight and improves thermal efficiency of the internal combustion reciprocating engine. Due to the negligible coefficient of thermal expansion and unique strength at elevated temperatures of carbon-carbon, the piston-to-cylinder wall 10 clearance is so small as to eliminate the necessity of piston rings. Use of the carbon-carbon piston has the effect of reducing the weight of other reciprocating engine components allowing the piston to run at higher speeds and improving specific engine performance.

18 Claims, 8 Drawing Figures

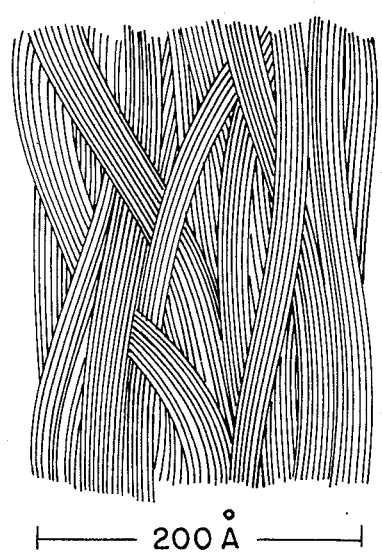
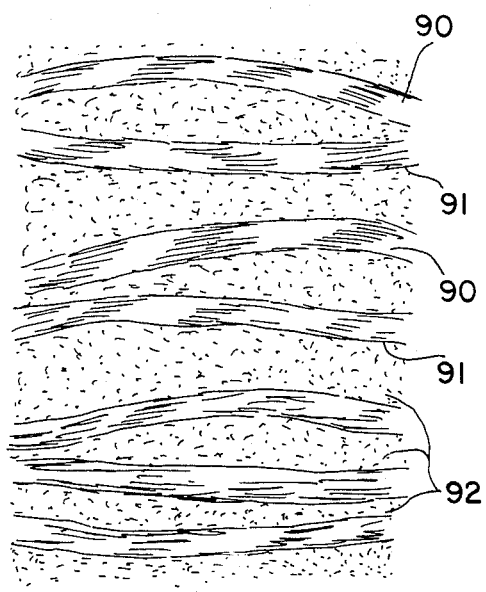
FIG. 5
FIG. 8
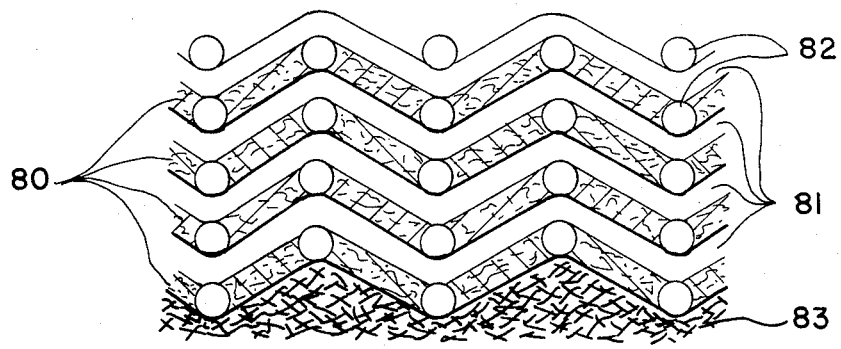
FIG. 7

LIGHTWEIGHT PISTON

ORIGIN OF THE INVENTION

The invention described herein was made by an employee of the United States Government and may be used by or for the Government for governmental purposes without the payment of any royalties thereon or therefor.

TECHNICAL FIELD

The invention relates to a carbon-carbon piston that is both lightweight and temperature resistant and a method of making said carbon-carbon piston.

BACKGROUND ART

Internal combustion reciprocating engines used in aeronautical and space applications must be both lightweight and temperature resistant. Aluminum pistons have been used in order to achieve these goals, but aluminum has a number of disadvantages. Due to the relative difference in the thermal histories and coefficient of thermal expansion of the aluminum piston and other mating engine components, large clearances between the piston and the adjacent wall are required to eliminate interference and/or galling between the piston and the cylinder wall. To improve engine efficiency, piston rings are used to seal the gap between the piston and the cylinder bore. Multiple rings with staggered gaps are required to prevent high pressure leakage and possible piston erosion or melting from local high flow rates at the ring gaps, piston, and cylinder wall interface. Relatively deep grooves are needed in the piston to support the ring loads. Because of the large clearance between cylinder wall and piston, large piston skirts are required to maintain piston alignment on the bore centerline. Piston mass is greatly increased due to increased piston thickness around the grooves, a larger piston skirt, and the cascading effect that increased piston weight has on other parts of the engine. In addition, aluminum melts at 1100° F., well below the typical combustion chamber temperature of 3000° F. Aluminum survives in this environment because of its high conductivity and active cooling provided by oil and air on its lower surface. Large amounts of lubricant are required to reduce piston and cylinder wall wear rates.

BRIEF SUMMARY OF THE INVENTION

Carbon-carbon is of considerable interest in the fields of aeronautics and aerospace where resistance to high temperatures and thermal shocks, coupled with high strength is important. The carbon-carbon piston represents a great improvement in the prior art. While performing the same function as an aluminum piston, a carbon-carbon piston eliminates the necessity of piston rings because of the negligible coefficient of thermal expansion of carbon-carbon, over 40 times smaller than that of aluminum. At high temperatures, carbon-carbon uniquely maintains its strength, allowing the piston to operate at both higher temperatures and higher pressures than a metal piston of the same weight. The thermal efficiency of the engine is improved because of the high emittance and low thermal efficiency of carbon-carbon, resulting in less heat lost into the piston and cooling system.

Accordingly, an object of the present invention is to reduce piston weight in an internal combustion reciprocating engine with the use of a carbon-carbon piston.

Another object of this invention is to reduce fuel consumption in an internal combustion reciprocating engine.

Another object of the present invention is to improve specific engine performance.

Another object of the present invention is to eliminate the necessity of piston rings in an internal combustion reciprocating engine.

Another object of the invention is to improve the thermal efficiency of the engine.

A further object of the present invention is to lower coolant loss and further improve thermal efficiency of an engine by using a carbon-carbon sleeve inserted in the piston cylinder.

According to the present invention the foregoing and other objects are attained through the use of a carbon-carbon piston. Carbon-carbon is lightweight and temperature resistant. Because of its negligible coefficient of thermal expansion, a carbon-carbon piston does not need piston rings. The use of carbon-carbon reduces both internal friction and the mass of moving parts of the engine which enables greater horsepower per cubic inch of displacement. The use of carbon-carbon also reduces the weight of reciprocating engine components in the engine such as, the crankshaft, connecting rods, flywheel and counter balances. In high temperature, lightweight applications, the use of carbon-carbon greatly improves specific engine performance.

BRIEF DESCRIPTION OF THE DRAWINGS

FIG. 5 is a view of an axial or unidirection fiber orientation;

FIG. 7 shows fiber orientation along a cross-section of the carbon-carbon sleeve taken along line VII—VII of FIG. 3; and FIG. 8 is a magnification (50×) of the woven cloth fibers.

DETAILED DESCRIPTION OF THE INVENTION

Figure 1:
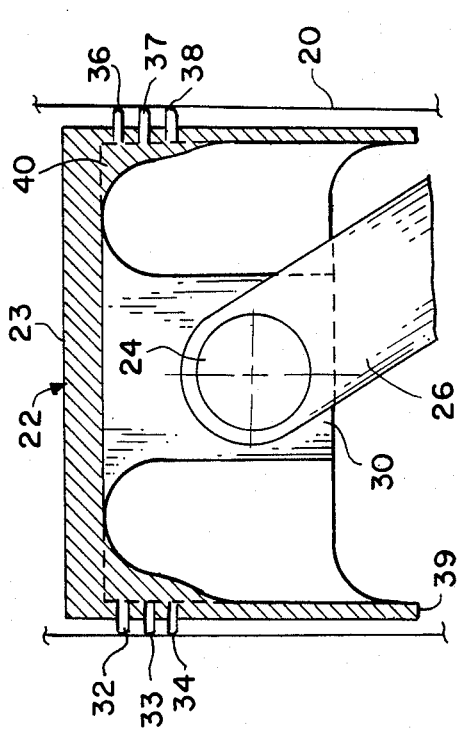
FIG. 1 is a side view of a conventional aluminum piston.

Referring now to the drawings and more particularly to FIG. 1, which represents a conventional aluminum piston. The piston 22 is attached to the wrist pin boss 30 which is attached to the connecting rod 26 by the wrist pin 24. The connecting rod 26 joins the piston 22 to the crankshaft and forces the piston 22 to move up and down within the cylinder 20. The clearance between the piston 22 and the cylinder wall 20 is approximately 0.006 inch. Due to this large clearance, a long piston skirt 39 is required to maintain proper piston alignment within the cylinder 20. Piston rings 36, 37, 38 seal the gap between the piston 22 and the cylinder wall 20, while piston grooves 32, 33, 34 are necessary to support the piston rings 36, 37, 38. Since the piston grooves 32, 33, 34 must be relatively deep to support the ring 36, 37, 38 loads, the piston 22 must be reinforced in the area 40 behind the grooves.

Figure 2:
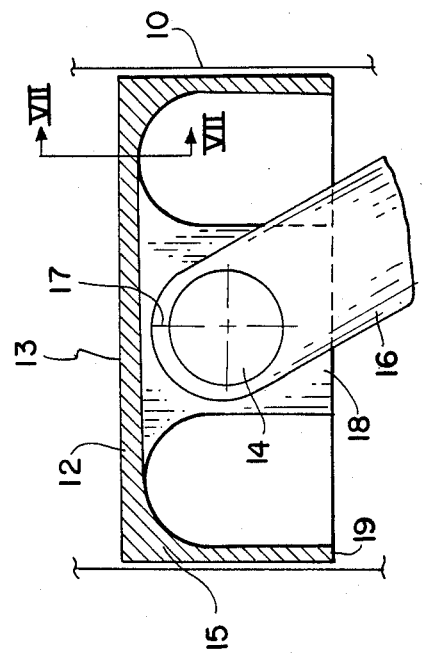
FIG. 2 is a side view of a piston composed of carbon-carbon.
Figure 4:
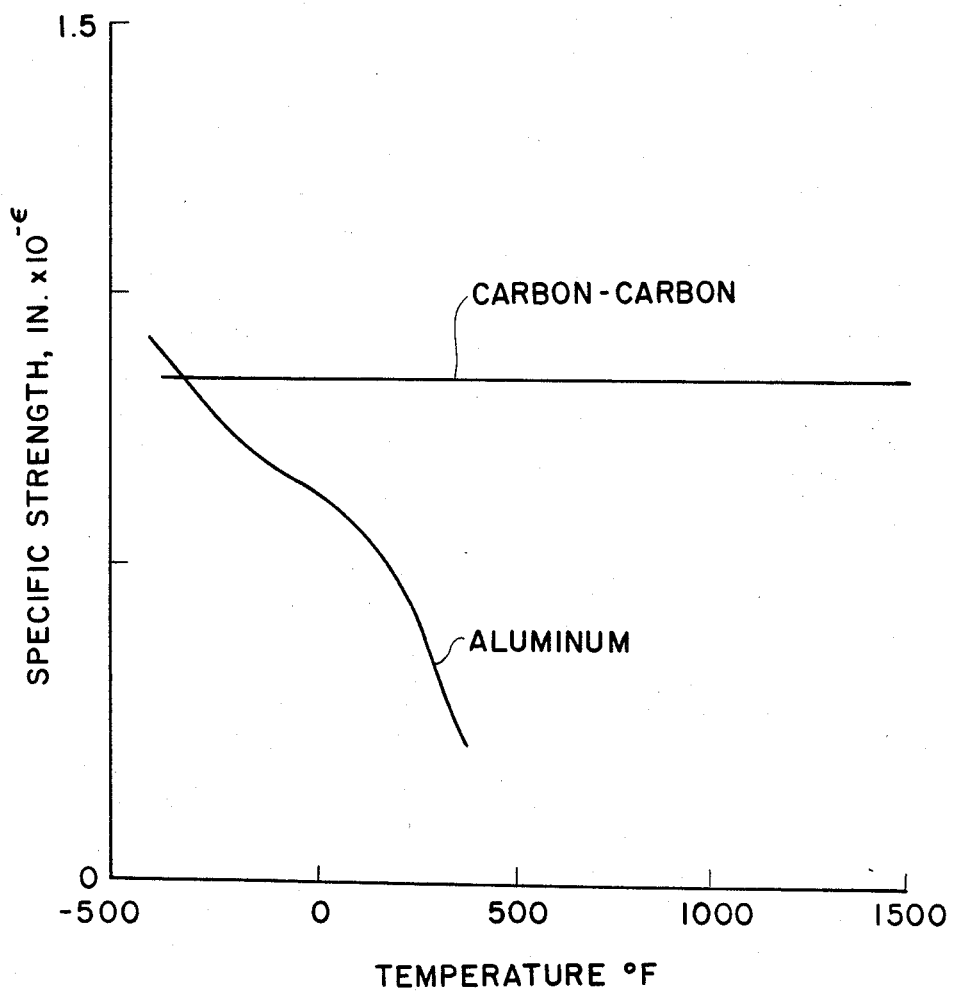
FIG. 4 is a specific strength versus temperature graph comparing carbon-carbon to aluminum.

The invention, a carbon-carbon piston 12 having a crown 13, is depicted in FIG. 2. Operation of the carbon-carbon piston in an internal combustion engine is similar to that of an aluminum piston. A wrist pin 14 attaches the connecting rod 16 to the wrist pin boss 18, which is an integral part of the piston 12. The connecting rod 16 once again joins the piston 12 to the crankshaft. The clearance between the piston 12 and the cylinder wall 10 depends on the size of the cylinder, and ranges from only 0.0001 inch to 0.001 inch. This small piston-to-cylinder clearance eliminates the necessity of piston rings and piston grooves. Factors contributing to this small clearance include the negligible coefficient of thermal expansion of $0.3 \times 10^{-6}$ in/in/°F. of carbon-carbon, which is over 40 times smaller than that of aluminum, and the fact that carbon-carbon uniquely maintains its strength at elevated temperatures as shown in FIG. 4. In addition, the piston skirt 19 need be only about 50% of the length of a conventional aluminum piston because of this small clearance.

The carbon-carbon material is made from carbon fibers which are pyrolyzed from a precursor fiber such as rayon or polyacrylonitrile (PAN). The fibers are then impregnated with a carbonaceous resin system such as furfuryl alcohol or phenolic resin and repyrolyzed several times to increase the strength and density of the material while subsequently reducing the porosity. In general, the PAN precursor is stretched about 80% either prior to or during stabilization, a cycle which involves heating the fiber at 200° C. for twenty-four hours in air. Carbonization, the next phase, consists of slowly heating the fiber in an inert atmosphere to 1000° C. The fibers are then graphitized by raising the temperature to the desired heat treatment temperature, usually ranging from 1000° C. to 2500° C.

Figure 6:
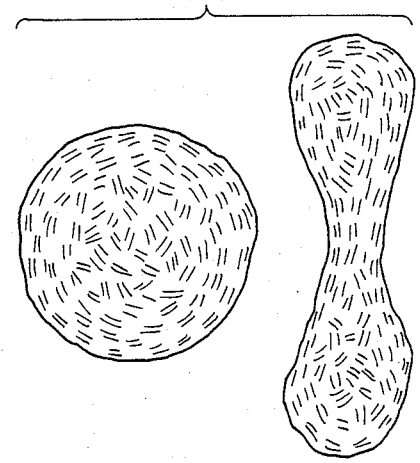
FIG. 6 is a view of random or mat fiber orientation.

The carbon-carbon piston is fabricated in a closed die using primarily a precursor fiber in a mat or random fiber (roving) orientation as shown in FIG. 6 with selective reinforcements consisting of unidirectional fibers or cloth as shown in FIG. 7 at the more highly loaded areas such as the crown 13 and wrist pin bosses 18. The unidirectional fiber or cloth is layered in a 0, ±45, 90 orientation to provide quasi-isotropic mechanical properties which are significantly higher than the random fiber/mat construction. The ultimate tensile strength, for example, is thirty-five ksi for the unidirectional fiber compared to only eight ksi for the random fiber. After the final pyrolysis cycle, the piston outside diameter 15 and wrist pin holes 17 are machined using conventional machining operations. The final fit of the piston 12 to the cylinder bore 10 is achieved by lapping or grinding the piston 12 to precisely fit the bore 10. Details of piston fabrication include cloth layers comprising the piston crown 13, multidirectional fibers comprising the outside diameter of the piston 15 and selectively oriented filaments comprising the wrist pin bosses 18. As an example, FIG. 7 shows the fiber orientation along a cross-section of the piston crown 13. The carbon cloth is represented by a warp fiber 80 and fill fibers 82. The voids 81 between the cloth layers are filled with the matrix material. The carbon mat 83 lies under the cloth layers.

Figure 3:
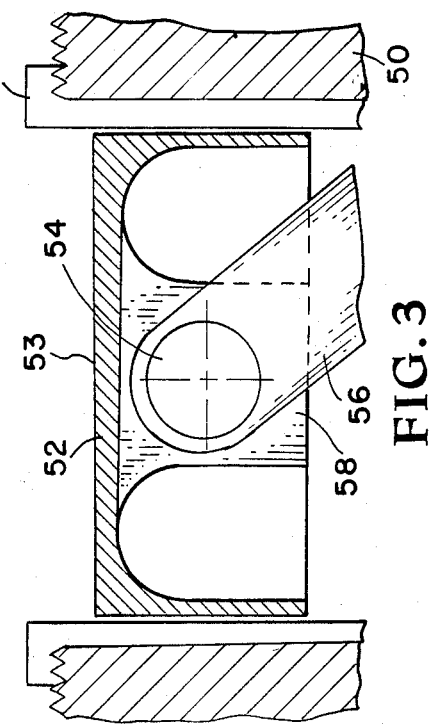
FIG. 3 is a side view of a carbon-carbon piston with a carbon-carbon cylinder wall.

One possible alternate embodiment of the invention that further improves the specific power by increasing thermal efficiency and lowering coolant loss is provided by the use of a carbon-carbon cylinder wall 60 in conjunction with a carbon-carbon piston 52 having a crown 53 and wrist pin bosses 58 as shown in FIG. 3. Again, the piston 52 is attached to the piston wrist pin bosses 58 by wrist pin 54. The cylinder wall 60 is a carbon-carbon sleeve inserted in a cylinder block area 50 of a more conventional material. The cylinder wall liner 60 is fabricated using the same material process, however, axial wrapping of cloth is used as the precursor material for the carbon fibers. The centerline of the cylinder provides the axis, the cloth being axially wrapped inside the inner diameter of the sleeve. The fiber orientation along a cross-section of the sleeve is the same as shown in FIG. 7.

FIG. 8 represents an enlargement of the woven cloth fibers. The FIG. is magnified 50 times, with the actual length of a side of the FIG. being 0.07 inch. Curved warp fibers 90, straight fill fibers 91, and the matrix 92 are all depicted.

In addition to being built into a new engine, the carbon-carbon piston can be adapted to fit into an existing engine. One advantage in either instance is the reduction of piston weight by elimination of piston rings, piston grooves, the reinforcing area behind the piston grooves and an approximately 50% reduction in the length of the piston skirt. The effect of a reduction in piston weight, in an existing engine is to permit a reduction in the weight of other reciprocating components of the engine such as the crankshaft, connecting rods, flywheel and counter balances by replacing the existing parts with lighter components. A new engine could be built with lighter components thus taking direct advantages of reduced piston weight. Overall, the piston can run at higher speeds, further increasing specific engine performance.

Another advantage of carbon-carbon is that it is lightweight, having a density of 0.067 lb/in$^3$ compared to 0.100 lb/in$^3$ for aluminum. The following is a Table comparing various properties of carbon-carbon to aluminum:

TABLE I

|  | ALUMINUM | CARBON-CARBON |
|---|---|---|
| MODULUS OF ELASTICITY, E, PSI | 10,000,000 | 12,000,000 |
| ULTIMATE TENSILE STRENGTH, PSI | 25,000 | 24,000 |
| YIELD STRENGTH, PSI | 11,000 | 24,000 |
| EMISSIVITY | .02 | 0.8 |
| THERMAL CONDUCTIVITY BTU/HR-FT-°F. | 80.0 | 4.0 |
| SPECIFIC HEAT, C BTU/LB-°F. | 0.23 | 0.3 |
| DENSITY, LB/IN$^3$ | 0.100 | 0.067 |
| COEFFICIENT OF THERMAL EXPANSION IN/IN/°F. | $12.5 \times 10^{-6}$ | $0.3 \times 10^{-6}$ |

The use of carbon-carbon also greatly improves thermal efficiency because less heat is lost to the piston and the cooling system due to the relatively high emissivity and low thermal conductivity of carbon-carbon as shown in Table I.

The possibility of blowby causing piston erosion or oxidation can be avoided by applying high temperature oxidation resistant coatings developed for carbon-carbon such as silicon carbide. The oxidation resistant coating is provided on the piston crown 13 by sacrificing several layers of carbon fiber for a layer of silicon carbide. An alternate approach would be to add oxidation inhibitors such as boron to the basic material during the impregnation cycles.

The invention may be practiced other than as described herein without departing from the spirit and scope of the appended claims.

What is claimed as new and desired to be secured by Letters Patent of the United States is:

1. The method of making a carbon-carbon piston comprising the steps of:
   placing a precursor fiber in a mat or random fiber orientation in a closed die;
   pyrolizing said precursor fibers;
   impregnating said precursor fibers with a carbonaceous resin system;
   stretching said precursor fiber prior to or during stabilization;
   stabilizing said material by heating the fiber in air;
   carbonizing said material by slowly heating the fiber in an inert atmosphere; and
   graphitizing said fibers by raising the temperature to the desired heat treatment temperature.

2. The method of making a carbon-carbon piston as in claim 1 wherein the precoursor fiber is stretched about 80% prior to or during stabilization, and the material is stabilized by heating the fiber at 220° C. for 23-25 hours.

3. The method of making a carbon-carbon piston as in claim 1 wherein the material is carbonized by slowly heating the fiber in an inert atmosphere to 1000° C.

4. The method of making a piston according to claim 1 wherein upon completion of the final pyrolysis cycle, piston outside diameter and wrist pin holes are machined using conventional machinery operations.

5. A method of making a piston as in claim 1 which includes the additional steps of adding oxidation inhibitors to said material during the impregnation cycle to avoid the possibility of blowby causing piston erosion or oxidation.

6. The method of making a piston according to claim 1 and further including the steps of:
   fitting said piston to the cylinder by lapping said piston to precisely fit the bore.

7. An improved piston for an internal combustion engine comprising:
   a carbon-carbon piston means composed of precursor fiber impregnated with a carbonaceous resin;
   said piston being constructed without piston grooves and without reinforcing material.

8. A piston according to claim 7 wherein said precursor fiber is rayon.

9. A piston according to claim 7 wherein said precursor fiber is polyacrylonitrile (PAN).

10. A piston according to claim 7 wherein said carbonaceous resin is furfuryl alcohol.

11. A piston according to calim 7 wherein said carbonaceous resin is phenolic resin.

12. A carbon-carbon piston as in claim 7 wherein the carbon-carbon piston is coated with a high temperature oxidation resistant material such as silicon carbide developed for avoiding piston erosion or oxidation.

13. An improved piston for an internal combustion engine comprising:
   a carbon-carbon piston means composed of a precursor material impregnated with a carbonaceous resin;
   said piston being constructed without piston grooves and without reinforcing material; and
   said piston having a crown area reinforced with unidirectional fibers or cloth layered in a 0, ±45, 90 orientation.

14. An improved piston for an internal combustion engine comprising:
   a carbon-carbon piston means composed of a precursor fiber impregnated with a carbonaceous resin;
   said piston being constructed without piston grooves and without reinforcing material; and
   said piston having wrist pin boss areas reinforced with unidirectional fibers.

15. An improved piston for an internal combustion engine comprising:
   a carbon-carbon piston means composed of a precursor fiber impregnated with a carbonaceous resin;
   said piston being constructed without piston grooves and without reinforcing material; and
   said piston having wrist pin boss areas reinforced with cloth layered in a 0, ±45, 90 orientation.

16. An improved piston for an internal combustion engine comprising:
   a carbon-carbon piston means composed of a precursor fiber impregnated with a carbonaceous resin;
   said piston being constructed without piston grooves and without reinforcing material; and
   said piston being impregnated with a high temperature oxidation resistant material such as boron developed for avoiding piston erosion or oxidation.

17. An improved piston for an internal combution engine comprising:
   a carbon-carbon piston means composed of a precursor fiber impregnated with a carbonaceous resin;
   said piston being constructed without piston grooves and without reinforcing material; and
   said piston being operable in a cylinder wall of a internal combustion engine, the wall of said cylinder being composed of a carbon-carbon sleeve inserted in a cylinder block area;
   whereby said cylinder wall improves specific engine power by increasing thermal efficiency and lowering coolant loss.

18. An improved piston for an internal combustion engine as in claim 17 wherein axially wrapped cloth is used as a precursor material for the carbon fibers of the carbon-carbon sleeve.

* * * * *